United States Patent [19]

Schein et al.

[11] 3,943,086

[45] Mar. 9, 1976

[54] WATER-SOLUBLE COATING COMPOSITION AND METHOD FOR MAKING SAME

[76] Inventors: Charles Schein, 52, Avenue Foch, 75016 Paris; Jean-Jacques Le Minez, 7, rue Mansart, 91540 Mennecy, both of France

[22] Filed: Feb. 27, 1974

[21] Appl. No.: 446,310

[30] Foreign Application Priority Data

Feb. 27, 1973 France .............................. 73.06962
June 22, 1973 France .............................. 73.22889

[52] U.S. Cl. 260/29.7 D; 260/29.7 AT; 260/78.4 D; 260/879; 260/887; 204/181
[51] Int. Cl.² .................... C08F 8/46; C08F 279/02
[58] Field of Search . 260/78.4 D, 887, 879, 29.7 D, 260/29.7 AT

[56] References Cited
UNITED STATES PATENTS

| | | | |
|---|---|---|---|
| 3,240,762 | 3/1966 | Wilks et al. | 260/78.4 |
| 3,518,213 | 6/1970 | Miyoshi et al. | 260/22 |
| 3,689,446 | 12/1969 | Furuya et al. | 260/23.7 |
| 3,766,215 | 10/1973 | Hesse et al. | 260/346.8 |

*Primary Examiner*—John Kight, III
*Attorney, Agent, or Firm*—Robert E. Burns; Emmanuel J. Lobato; Bruce L. Adams

[57] ABSTRACT

A method is described for preparation of an adduct product for use as a binder medium for paints to be applied by electrodeposition. This product is the adduct resulting from the solution of a solid polycycloalkadiene polymer having a molecular weight of 700–800 in a liquid polyalkadiene polymer of 500–5000 molecular weight after the initiation of the adduct formation reaction by the addition of an unsaturated polycarboxylic acid or its anhydride. The adduct is formed by adding the acid or anhydride to the solution of the solid polymer in the liquid. The resulting adduct product is suitable for use as a paint binder for electrodeposited paints when diluted with water. The paint composition may be formed by mixing of pigments into the binder and then suspending the mixture in water.

23 Claims, No Drawings

WATER-SOLUBLE COATING COMPOSITION AND METHOD FOR MAKING SAME

This invention relates to water-dilutable coating products intended to be applied onto electro-conducting or non-electro-conducting supports by conventional application techniques and by the technique of electrodeposition.

The invention relates more especially to a method for the preparation of coating product obtained by the addition of a polymerized diene and of an ethylenically unsaturated polycarboxylic acid or of the corresponding anhydride.

These addition reactions are known, which make use of the conventional Diels-Adler reaction and which result notably in maleic acid modified oils obtained by the addition of maleic anhydride and polymerised or non-polymerised unsaturated triglycerides, and in the "maleic resins" obtained by the addition of maleic anhydride and of abietic acid and/or the isomers of this acid.

These various products are currently used in the surface coatings industry in organo-soluble or hydro-soluble form. More recently, proposals have been made for replacing the triglycerides or their polymers by polymers of diolefins in the addition reactions with the unsaturated polycarboxylic acids. Thus, French Pat. No. 1,509,692 describes a hydrosoluble coating product obtained from polymers or copolymers of conjugated diolefins having a high proportion of double bonds in the 1, 4 position and from an unsaturated dicarboxylic acid.

French Pat. No. 1,467,595 describes a method for the preparation of an addition product by the combination of a liquid polybutadiene and of maleic anhydride.

The various reaction products obtained by the methods just described may be used in the technique of electrodeposition as water-dilutable binders.

These products, when they are used in accordance with this electrodeposition technique, after appropriate pigmentation, result in electro-coatings of excessive thickness, having a surface appearance of uneven quality, and possessing limited stability and inadequate mechanical properties.

In order to overcome these disadvantages, it is proposed in U.S. Pat. No. 3,351,675 to modify a maleic anhydride-polybutadiene adduct by a non-thermoreactive phenolic resin.

In French Pat. No. 2,013,612, the preparation is described of a hydrosoluble coating product constituted of a maleic anhydride-polybutadiene adduct, one or more thermoreactive phenolic compounds, and possibly also one or more hydroxyl compounds.

These various coating products necessitate the use of long and difficult preparation processes. Although the technique of forming the adduct may be simple and rapid, the same is not true for the thermoreactive or non-thermoreactive phenolic compounds.

In conclusion, the various known processes described above for the preparation of water-dilutable coating products possess at least one of the following two disadvantages:
- the execution of the process is long and difficult, and therefore costly, and may require a number of base compounds.
- the electro coating obtained by the application of the coating product using the technique of electrodeposition is not satisfactory from the point of view of surface condition, toughness, hardness and protection of the support from corrosion.

Other methods of preparing coating products are also known, which also possess these disadvantages:

In U.S. Pat. No. 2,812,371, a description is given of a method for the preparation of a siccative oil, a copolymer of diolefins and cyclo-diolefins. A small proportion of maleic anhydride may optionally be added later, in order to improve the wetting property of the pigments.

However, the siccative oil obtained by the process can neither be diluted nor made soluble in water. Moreover, this siccative oil is not intended to be applied by electrodeposition.

In French Pat. No. 2,033,758, a description is given of a water-dilutable coating product, capable of being used in varnishes or paints to be applied by electrodeposition. This product is obtained by the addition of dicarboxylic ethylenic compounds and polybutadiene.

Finally, in British Pat. No. 1,102,652, a description is given of a water-soluble coating product, having as its base an addition product of an unsaturated $\alpha\beta$ dicarboxylic compound and of a diolefinic polymer. It is mentioned as a diolefin of butadiene and isoprene. The comonomers which may be copolymerized to diolefins are styrene, acrylonitrile and $\alpha$-olefin.

It is an objective of the invention to overcome the disadvantages referred to above by proposing a hydrosoluble coating product giving excellent performance, sufficiently stable with regard to oxidation, perfectly reproducible and which possesses very good electrodeposition properties.

The execution of this process according to the invention is easier than that of the hitherto known processes, and the electrocoating obtained by appplication using the electrodeposition technique is of improved quality.

These results are achieved by introducing, into a maleic anhydride - diolefin composition, a cyclodiene polymer of low un-saturation and of low molecular weight.

The method according to the invention is characterized by the fact that, in the first place hot mixing is carried out of at least one liquid polyalkadiene of molecular weight from 500 to 5000, and of at least one solid polycycloalkadiene polymer of molecular weight from 700 to 800 said solid polymer having a ball and ring melting point of from 70° to 100°C, that this mixture is then cooled and is maintained subsequently at a substantially constant temperature, and that finally there is added to this mixture at least one unsaturated polycarboxylic acid or an unsaturated polycarboxylic acid anhydride.

It follows from the principal characteristic that the addition product is obtained from a solid polymer. This polymer contains a polycycloalkadiene.

The other characteristics of the invention will become apparent from the following description.

An addition product which is water-soluble after neutralization and which contains free carboxyl radicals is obtained by the method according to the invention in which:

At least one polyalkadiene in the liquid state and of low molecular weight is first associated with a solid polymer having a ball and ring melting point of from 70° to 100°C, composed principally of polycycloalkadiene and optionally also, in a smaller proportion, of at least one polyalkadiene. The ratio by weight of liquid polyalkadiene/solid polycycloalkadiene is from 60 to 95%. The reaction temperature is from 150° to 220°C.

This polymer dispersion is then caused to react, by an addition reaction, with at least one ethylenically unsaturated polycarboxylic acid and/or an anhydride of this acid. The weight of polycarboxylic acid and/or anhydride is from 5 to 25% of the weight of the polyalkadiene-polycycloalkadiene association already defined.

As will be seen later, an addition product prepared by this method may be diluted in a lyotrope or water miscible solvent and neutralised by a nitrogenised base. This addition product, utilised in pigmented form and applied by anodic electrodeposition technique, results in an electrocoating of excellent quality.

The polycarboxylic acid used in the composition of the addition product is fumaric acid or maleic acid.

The addition product is prepared either from a single liquid polyalkadiene, or from a mixture of polyalkadienes. As a general rule, a polyalkadiene without hydroxyl and carboxyl terminal radicals is used. However, the mixture of polyalkadienes may comprise at least one polyalkadiene without hydroxyl and carboxyl terminal radicals, and/or at least one polyalkadiene having a hydroxyl terminal radical, and/or at least one polyalkadiene having a carboxyl terminal radical.

As a polyalkadiene without hydroxyl and carboxyl terminal radicals, the following are preferred:

a. 1-3 polybutadiene of molecular weight from 1000 to 1500, of cis form, from 80 to 95% b) 1-3 polypentadiene of molecular weight from 500 to 2000
| of trans 1,2 + trans 1,4 form | = | 50 to 80 % |
| cis 1,2 | | 15 to 25 % |
| vinyl | | 2 to 8 % |

Among the polyalkadienes having hydroxyl terminal radicals, those preferably used are polybutadienes having hydroxyl terminal radicals of hydroxyl index less than 20, iodine index from 300 to 450, and of the form:

| trans | 1,4 | : | 50 to 70 % |
| cis | 1,4 | : | 60 to 20 % |
| vinyl | | : | 5 to 25 % |

Among the polyalkadienes having carboxyl terminal radicals, those preferably used are polybutadiene having carboxyl terminal radicals and having a carboxyls radicals percentage of from 1 to 5, a molecular weight of from 1500 to 5000 and of the form:

| trans | 1,4 | : | 50 to 70 % |
| cis | 1,4 | : | 20 to 60 % |
| vinyl | | : | 5 to 25 % |

The solid polymer intended to be associated with the liquid polyalkadiene has a ball and ring melting point of from 70° to 100°C and preferably from 90° to 100°C. Its molecular weight is from 700 to 800 and its bromine index is from 60 to 65. Such a polymer is composed of a major proportion of polycycloalkadiene and of a smaller proportion of polyalkadiene. The preferred polycycloalkadiene is polycyclopentadiene and the preferred polyalkadiene is polybutadiene.

These solid polymers are known and correspond notably to the types of products known under the commercial names of "ESCOREZ 8100," "ESCOREZ 8090" manufactured by the ESSO Company.

Depending on the various types of polyalkadienes used, the ratios by weight of polyalkadienes and polycycloalkadienes are as follows:

| 1) | Liquid polyalkadiene without hydroxyl and carboxyl terminal radicals | 60 to 90 % |
| | Solid polycycloalkadiene | 40 to 10 % |
| 2) | Liquid polyalkadiene having carboxyl terminal radical | 60 to 95 % |
| | Solid polycycloalkadiene. | 40 to 5 % |
| 3) | Liquid polyalkadiene without hydroxyl and carboxyl terminal radicals | 50 to 70 % |
| | Liquid polyalkadiene with hydroxyl terminal radical. | 45 to 15 % |
| | Solid polycycloalkadiene | 40 to 5 % |
| 4) | Liquid polyalkadiene without hydroxyl and carboxyl terminal radicals | 50 to 70 % |
| | Liquid polyalkadiene with carboxyl terminal radical. | 45 to 15 % |
| | Solid polycycloalkadiene | 40 to 5 % |
| 5) | Liquid polyalkadiene with carboxyl terminal radical. | 50 to 70 % |
| | Liquid polyalkadiene with hydroxyl terminal radical. | 45 to 15 % |
| | Solid polycycloalkadiene | 40 to 5 % |
| | Liquid polyalkadiene without hydroxyl and carboxyl terminal radicals | 50 to 70 % |
| | Liquid polyalkadiene with carboxyl terminal radical. | 45 to 15 % |
| | Liquid polyalkadiene with hydroxyl terminal radical. | 45 to 15 % |
| | Solid polycycloalkadiene | 40 to 5 % |

The association of the liquid polyalkadiene or mixture of liquid polyalkadienes and of the solid polycycloalkadiene is obtained by dissolving of the latter in the polyalkadienes at a temperature from 150° to 220°C and preferably at 200°C. The combination of the two constituents is controlled by following the variations in the refractive index, in the viscosity and in the limpidity of a sample in a test tube examined at a temperature of 20°C.

When these examinations have been carried out, the temperature of the mixture of polyalkadiene and polycycloalkadiene is raised to about 190°C. The unsaturated polycarboxylic acid and/or the anhydride of this acid is then added slowly and regularly, maintaining the temperature constant. This addition may take, for instance, 2 hours. After the last addition has been made, the addition reaction is monitored by dimethyl amine coloration.

For approximately 2 hours the temperature is then maintained at from 190° to 200°C. The material obtained is then cooled to a temperature of about 140°C, and there are then added one or more lyotrope solvents such as glycol ethers, in particular ethylene glycol monoalkylic ether or ethylene glycol monobutylic ether, or again alcohols having from 1 to 10 carbon atoms, such as decyl alcohol and tertiary butyl alcohol.

The addition product obtained is diluted to a concentration from 65 to 90%. Either an immediate neutralization is then carried out, or a later neutralization after storage of the product.

The neutralization agent is a nitrogenized base such as ammonia or a primary, secondary or tertiary aliphatic or cycloaliphatic amine, or again an amino alcohol. Apart from ammonia, the preferred neutralization agents are triethyl amine, diethylene amine and dimethyl ethanol amine. The quantity of neutralizing agent is a function of the degree of neutralization selected. The latter is however from 30 to 60% of the total acidity.

The preparation of the pigmented composition is carried out by means of conventional dispersion techniques, using in particular a roller crusher or a disperser utilizing microelements. The application may be carried out using a spray gun, roller, by immersion or by the electrodeposition technique, in which the conducting support to be coated is the anode.

In all cases, a brief passage of the coated support through a temperature of from 150° to 200°C enables the electrocoating to be hardened.

The following non-limiting examples serve to explain the execution of the invention and give the results obtained:

EXAMPLE 1

Preparation of a Maleic Anhydride/Polycycloalkadiene/Polyalkadiene Adduct

| Products | Quantities |
|---|---|
| Polybutadiene 1 - 3 | 1,000 parts by weight |
| Polycyclopentadiene | 250 parts by weight |
| Antioxidising agent | 20 parts by weight |
| Maleic anhydride | 300 parts by weight |

The polycyclopentadiene is the substance known under the trade name of ESCOREZ 8100 or ESCOREZ 8090 manufactured by the ESSO Company. The antioxidizing agent is the substance known under the name BKF, manufactured by the BAYER Company.

The above-mentioned quantities of polybutadiene 1-3, polycyclopentadiene and antioxidizing agent are introduced into a four-neck vessel fitted with a stirrer, a thermometer, an inert gas inlet pipe, a reflux condensor fitted with a separator of the "Dean Stark" type and a heating jacket. This vessel is heated progressively to a temperature of 200°C. A sufficient flow of inert gas, preferably nitrogen, is provided to ensure that there is no risk of oxidation. The vapors are condensed and collected in the separating condensor. The temperature of the mixture is allowed to fall to 180°C and the viscosity and appearance are continuously observed. As soon as the specimen is clear on glass, the temperature of the mixture is raised to 190°C and the above-mentioned quantity of maleic anhydride is added in four batches at intervals of 30 minutes. 15 minutes after the last batch of maleic anhydride has been added, the mixture is inspected by regularly taking a sample of the reaction substance in a bowl-plate and by adding to this sample a few droplets of dimethyl amine so that an orange color indicates the presence of free maleic anhydride. From the time when this orange color disperses, the temperature of the mixture is maintained at 190°C for 1 hour. During the introduction of the maleic anhydride, any exothermic reaction is prevented by cooling the flask if necessary. After the temperature has been maintained at 190°C for 1 hour, the mixture is cooled and its viscosity is measured. When the temperature reaches 180°C, 75 parts by weight of decyl alcohol are added, then when the temperature has fallen to 140°C, 450 parts by weight of ethyl glycol are added. The product is then filtered, then stored at ambient temperature.

EXAMPLE 2

Use of the Adduct of Example 1 in the Manufacture of a Paint Capable of Being Applied by Electrodeposition.

The following constituents are mixed in the quantities indicated in a disperser fitted with microelements:

| Products | Quantities |
|---|---|
| Adduct of Example 1 | 267 parts by weight |
| Rutile titanium oxide | 35 parts by weight |
| Hydrated aluminium silicate | 45 parts by weight |
| Red iron oxide | 17.5 parts by weight |
| Strontium bromate | 2.5 parts by weight |
| Ethyl glycol | 33 parts by weight |

The paint obtained has a pigment/binder ratio of one-half and a dry extract of 75%.

This paint is introduced into a metal tank serving as a cathode, containing 1000 g of stirred deionized water and 17 cm$^3$ of ammonia at 22° Baumé. This volume is made up to 2,500 cm$^3$ with deionized water. The pH value of the solution is from 6.3 to 6.6 and the resistivity is from 500 to 800 ohms. cm.

This paint is deposited on phosphated steel plates under the following conditions:

| | |
|---|---|
| Anode surface area | 200 cm$^2$ |
| Ratio of anode/cathode areas | 1/3.75 |
| Bath temperature | 23°C ± 2°C |
| Applied electrical voltage | 200 Volts |
| Duration | 150 seconds |
| Final current intensity | 0.2 Ampere |
| Baking temperature and duration | 12 minutes at 185°C |

Results and Characteristics of Product Obtained

| | |
|---|---|
| Thickness of electrocoating | 18 to 22 microns |
| Appearance | Good |
| Persoz hardness | 150 seconds |
| ERICKSEN swaging | 7 to 8 mm |
| Resistance to saline mist according to ASTM standard | In excess of 250 hours. |

EXAMPLE 3

Preparation of a Maleic Anhydride/Polycycloalkadiene/Polyalkadienes Adduct

| Products | Quantities |
|---|---|
| Polybutadiene 1-3 | 1000 parts by weight |
| Polypentadiene 1-3 | 800 parts by weight |
| Polycyclopentadiene | 400 parts by weight |
| Antioxidising agent | 36 parts by weight |
| Maleic anhydride | 740 parts by weight |

The polycyclopentadiene used is the product known commercially under the name of "ESCOREZ 8090 H" manufactured by the ESSO Company. The anti-oxidizing agent is the substance known by the name "BKF" made by the BAYER company.

The above-mentioned quantities of polybutadiene 1-3, polypentadiene 1-3, polycyclopentadiene and anti-oxidising agent were introduced into a four-neck flask fitted with a stirrer, a thermometer, an inert gas inlet pipe, a reflux condensor fitted with a separator of the DEAN STARK type and a heating jacket. The mixture was progressively heated to a temperature of about 200°C. A sufficient flow of inert gas, preferably nitrogen, was provided to ensure that there was no risk of oxidation. The vapors are condensed and collected in the separator-condensor. The temperature of the mixture was then allowed to fall to 180°C and the viscosity and appearance of this mixture was observed at regular intervals. As soon as a specimen appeared clear on glass, the temperature of the mixture was raised to 190°C and the above-mentioned quantity of maleic anhydride was added, in four batches at intervals of 30 minutes. 15 minutes after the last batch of maleic anhydride had been added, the combining of this maleic anhydride was checked by taking regular samples of the reaction substance in a bowl-plate and by adding a few droplets of dimethyl aniline to this sample. From the time when the orange colour indicating the presence of free maleic anhydride had disappeared, the temperature of the mixture was maintained at 190°C for 1 hour. During the whole time of introduction of the above-mentioned quantity of maleic anhydride, the flask was cooled, if necessary, to prevent any exothermic reaction. After 1 hour, during which the temperature was maintained at 190°C, the flask was cooled and the viscosity of the mixture measured. When the temperature of this mixture had fallen to 180°C, 75 parts by weight of decyl alcohol were added and then, when the temperature had reached 140°C, 450 parts by weight of ethyl glycol were added. The product was filtered, then stored at ambient temperature.

EXAMPLE 4

Use of the Adduct of Example 3 for the Production of a Paint Capable of Being Electrodeposited This electrodeposition paint is prepared from the following substances using the quantities indicated

| Products | Quantities |
| --- | --- |
| Adduct of Example 3 | 400 parts by weight |
| Carbon black | 7 parts by weight |
| Kaolin | 86 parts by weight |
| Lead silico-chromate | 7 parts by weight |
| Ethylglycol | 34 parts by weight |

The paint obtained had a pigment/binder ratio of one-third and a dry extract of 75%.

400 g of this paint were introduced into a metal bath serving as a cathode and containing 1000 g of deionized water and 30 cm³ of ammonia at 22° Baume. The volume was made up to 2,500 cm³ with deionized water. The pH value is from 6.4 to 6.8 and the resistivity is from 450 to 680 ohms.cm.

The paint obtained is deposited on phosphated steel plates under the following conditions:

| | |
| --- | --- |
| Surface area of anode | 200 cm² |
| Ratio of anode/cathode surface areas | 1/3.75 |
| Temperature of bath | 23°C ± 2°C |
| Applied electrical voltage | 150 Volts |
| Duration | 150 seconds |
| Final current intensity | 0.15 A |
| Baking duration and temperature | 12 minutes at 185°C |

Results and Characteristics of the Product Obtained

| | |
| --- | --- |
| Thickness of electrocoating | 20 to 22 microns |
| Appearance | good |
| Persoz hardness | 190 seconds |
| Ericksen swaging | 7 to 8 mm |
| Resistance to saline mist according to ASTM standard | greater than 250 hours |

EXAMPLE 5

Preparation of a Maleic Anhydride/Polycycloalkadiene/Polyalkadienes Adduct

| Products | Quantities |
| --- | --- |
| Polybutadiene with hydroxyl terminal radical | 200 parts by weight |
| Polypentadiene 1-3 | 100 parts by weight |
| Polybutadiene 1-3 | 700 parts by weight |
| Polycyclopentadiene | 250 parts by weight |
| Anti-oxidising agent | 20 parts by weight |
| Maleic anhydride | 300 parts by weight |

The polycyclopentadiene used is the product known commercially under the name of ESCOREZ 8090 H manufactured by the ESSO company. The anti-oxidizing agent is the product known commercially under the name "BKF" manufactured by the BAYER company.

The above-mentioned quantities of polybutadiene 1-3, polybutadiene with hydroxyl terminal radical, polycyclopentadiene, polypentadiene 1-3 and anti-oxidizing agent are introduced and heated progressively to 200°C in a four-neck flask fitted with a stirrer, a thermometer, an inert gas inlet pipe, a reflux condensor fitted with a separator of the DEAN STARK type and a heating jacket.

A sufficient flow of inert gas, preferably nitrogen, to prevent any risk of oxidation was provided. The vapors are condensed and collected in the separator condensor of the DEAN STARK type. The temperature of the mixture was then allowed to fall to 180°C and the viscosity and appearance of the mixture were observed at regular intervals. From the time when the specimen was clear on glass, the temperature was maintained at 180°C for 30 minutes, and then raised to 190°C. The quantity of maleic anhydride given above was then added in four batches at intervals of 30 minutes. During the entire duration of introduction of the maleic anhydride, any exothermic reaction was prevented, if necessary, by cooling the flask. After the last batch of maleic anhydride had been added, the temperature of the mixture was maintained at 190°C and the flask was then cooled.

The viscosity of the mixture was measured. After the temperature had reached 180°C 50 parts by weight of decyl alcohol were added and then, when the temperature had reached 140°C, 375 parts by weight of ethyl glycol were added.

The product is filtered and stored at ambient temperature. The dry extract of the adduct obtained is 78.5%.

EXAMPLE 6

Utilization of the Adduct of Example 5 for the Manufacture of a Paint Capable of Electrodeposition

| Products | Quantities |
| --- | --- |
| Adduct of example 5 | 267 parts by weight |
| Rutile titanium oxide | 35 parts by weight |
| Kaolin | 45 parts by weight |
| Red iron oxide | 17.5 parts by weight |
| Barium chromate | 2.5 parts by weight |
| Ethylglycol | 33 parts by weight |

The paint obtained has a pigment/binder ratio of 1/2.1 and a dry extract of 78%.

This paint is introduced into a metal bath serving as cathode and containing 1000 g of stirred deionized water, and 21 cm$^3$ of ammonia at 22° Baume. The volume is made up to 2500 cm$^3$ with deionized water. The pH value of the solution is from 6.7 to 6.9 and the resistivity from 500 to 800 ohms.cm.

This paint is deposited on phosphated steel plates under the following conditions:

| | |
| --- | --- |
| Anode surface area | 200 cm$^2$ |
| Ratio of anode/cathode surface areas | 1/3.75 |
| Bath temperature | 23 ± 2°C |
| Applied electrical voltage | 200 volts |
| Final current intensity | 0.150 A |
| Baking temperature and duration | 12 minutes at 185°C. |

Results and Characteristics of the Product Obtained

| | |
| --- | --- |
| Thickness of electrocoating | 18 to 22 microns |
| Appearance | good |
| Persoz hardness | 160 seconds |
| Ericksen swaging | 7 to 8 mm |
| Resistance to saline mist according to ASTM standard | greater than 250 hours |
| Penetration test | 90 % |

The penetration test is defined by the ratio of the thicknesses of the external and internal electrocoatings on a hollow object constituted of an iron cylinder of 500 cm$^3$ perforated by two holes of 8 mm diameter at the center of the two parallel, circular faces of the cylinder.

It was found that there was an improvement in the penetration as compared with a composition containing no polybutadiene having a hydroxyl free radical. Moreover, the presence of the hydroxyl radical renders the resin more soluble and for that reason less solvent is required.

EXAMPLE 7

Preparation of a Maleic Anhydride/Polycycloalkdiene/Polyalkadienes Adduct

| Product | Quantities |
| --- | --- |
| Polybutadiene 1-3 | 1000 parts by weight |
| Polybutadiene with carboxyl terminal radical | 500 parts by weight |
| Polypentadiene 1-3 | 300 parts by weight |
| Polycyclopentadiene | 400 parts by weight |
| Antioxidising agent | 36 parts by weight |
| Maleic anhydride | 740 parts by weight |

The polycyclopentadiene is the substance known commercially by the name of ESCOREZ 8090 H manufactured by the ESSO company. The anti-oxidising agent is the substance known commercially by the name of BKF manufactured by the BAYER company. The preparation of the adduct is carried out in the same manner as that described in example 5. The dilution is carried out using 804 parts by weight of ethyl glycol. The dry extract obtained is 78.5%.

EXAMPLE 8

Utilization of the Adduct of Example 7 for the Manufacture of a Paint Capable of Electrodeposition

| Product | Quantities |
| --- | --- |
| Adduct of example 7 | 400 parts by weight |
| Carbon black | 7 parts by weight |
| Lead silico-chromate | 7 parts by weight |
| Kaolin | 86 parts by weight |
| Ethylglycol | 34 parts by weight |

The paint obtained has a pigment/binder ratio of 1/3.14 and a dry extract of 77.5%.

384 g of this paint is introduced into a metal bath serving as a cathode and containing 1000 g of stirred deionized water and 31 cm$^3$ of ammonia at 22° Baume. The volume is made up to 2500 cm$^3$ using deionized water. The pH value of the solution is from 6.3 to 6.8 and the resistivity is from 500 to 800 ohm.cm.

The paint obtained is deposited on phosphated steel plates under the following conditions:

| | |
| --- | --- |
| Anode surface area | 200 cm$^2$ |
| Ratio of anode/cathode surface areas | 1/3.75 |
| Bath temperature | 23°C ± 2°C |
| Applied electrical voltage | 200 Volts |
| Duration | 150 seconds |
| Final current intensity | 0.2 amps |
| Baking temperature | 12 minutes at 185°C |

Results and Characteristics of the Electrocoating

| | |
| --- | --- |
| Thickness of electrocoating | 18 to 22 microns |
| Appearance | good |
| persoz hardness | 170 seconds |
| Ericksen swaging | 7 to 8 mm |
| Resistance to saline mist according to ASTM standard | exceeding 250 hours |
| Penetration test | 85% |

It was found that there was an improvement in penetration by comparison with a composition not containing polybutadiene having a carboxyl terminal radical. Similarly, the presence of the carboxyl terminal radical makes the resin more soluble so that less solvent is required.

As can be seen from the results of the invention, the use of a polycycloalkadiene for the preparation of an electrodepositable paint enables the qualities of the electrocoating to be improved. In particular, the polycycloalkadiene limits the thickness of the electrocoating, gives it better endurance and increases its hardness.

Since polycycloalkadiene possesses high chemical inertia and a high resistance to hydrolysis, better protection of the supports from corrosion result.

Another advantage of the invention resides in the use of polycycloalkadiene in the solid state, which enables the process to be carried out in a convenient manner, which is not the case using known processes which employ notably dicyclopentadiene and which necessitate an additional unit for transforming the dimer into a monomer.

We claim:

1. A method for the preparation of an addition product binder suitable for a water-soluble coating composition capable of being applied by electrodeposition, wherein at least one solid polycycloalkadiene having a ball and ring melting point of from 70° to 100°C and a molecular weight of from 700 to 800 is dissolved in at least one liquid polyalkadiene conjugated polymer of molecular weight from 500 to 5000 by mixing; this mixture is maintained at a substantially constant temperature and an adduct formation reaction is initiated by the addition of at least one unsaturated polycarboxylic acid or its anhydride to the dissolved mixture.

2. The method according to claim 1, wherein the polycarboxylic acid or the anhydride is added to the polycycloalkadiene-polyalkadiene mixture at a temperature of from 170° to 200°C.

3. The method according to claim 1, wherein the polycarboxylic acid or anhydride is added to the polycycloalkadiene-polyalkadiene mixture with exclusion of air.

4. The method according to claim 1, wherein to 75 to 90% by weight of the polycycloalkadiene-polyalkadiene mixture are added to from 25 to 10% by weight of unsaturated polycarboxylic acid or anhydride.

5. A method according to claim 1, characterized by the fact that, after the polycarboxylic acid or anhydride has been added, cooling is carried out, and then the resulting addition product is dissolved in at least one water miscible solvent.

6. The method according to claim 5, wherein after the addition product has been dissolved, the solution is neutralized by the use of at least one nitrogenized base.

7. The method according to claim 1, wherein the solid polycycloalkadiene is dissolved in at least one liquid polyalkadiene without carboxyl and hydroxyl terminal radicals.

8. The method according to claim 7, wherein the polyalkadiene without carboxyl and hydroxyl terminal radicals in a 1-3 polybutadiene of molecular weight from 1000 to 1500.

9. The method according to claim 7, wherein the polyalkadiene without carboxyl and hydroxyl terminal radicals is a 1-3 polypentadiene of molecular weight of 500 to 2000.

10. The method according to claim 1, wherein the solid polycycloalkadiene is dissolved in at least one liquid polyalkadiene comprising at least one polyalkadiene having a hydroxyl terminal radical.

11. The method according to claim 10, wherein the polyalkadiene having a hydroxyl terminal radical is a polybutadiene having a hydroxyl index less than 20, an iodine index of from 300 to 450 and comprising from 50 to 70% of the 1.4 trans form, from 20 to 60% of the 1.4 cis form, and from 5 to 25% of vinyl form.

12. A method according to claim 1, wherein the solid polycycloalkadiene is dissolved in at least one polyalkadiene comprising at least one polyalkadiene having a carboxyl terminal radical.

13. The method according to claim 12, wherein the polyalkadiene having a carboxyl terminal radical is a polybutadiene having a percentage of carboxyl of from 1 to 5, a molecular weight of from 1500 to 5000, and possessing 50 to 70% of 1,4 trans form, from 20 to 60% of 1,4 cis form, and from 5 to 25% of vinyl form.

14. The method according to claims 1 wherein the mixture of polyalkadienes and polycycloalkadienes comprises from 60 to 95% by weight of polyalkadienes and from 40 to 5% by weight of polycycloalkadienes.

15. The method according to claim 1 wherein the mixture of polyalkadienes and polycycloalkadienes comprises 45 to 15% by weight of polyalkadiene having a carboxyl radical or of polyalkadiene having hydroxyl radical, from 50 to 70% by weight of polyalkadiene having no hydroxyl and carboxyl terminal radicals and from 40 to 5% by weight of polycycloalkadiene.

16. The method according to claim 1 wherein the mixture of polyalkadienes and polycycloalkadienes comprises 45 to 15% of polyakadiene having carboxyl terminal radical, from 45 to 15% by weight of polyalkadiene having a hydroxyl terminal radical, from 50 to 70% by weight of polyalkadiene without carboxyl and hydroxyl terminal radicals, and 40 to 5% by weight of solid polycycloalkadiene.

17. The method according to claim 1, wherein the unsaturated polycarboxylic acid is maleic acid or fumaric acid.

18. The method according to claim 1, wherein the liquid polyalkadiene and the solid polycycloalkadiene are mixed at a temperature of from 150° to 220°C.

19. The method according to claim 1 wherein the mixture of polyalkadienes and polycycloalkadienes comprises from 50 to 70% by weight of polyalkadiene having a carboxyl terminal radical, 45 to 15% by weight of polyalkadiene having a hydroxyl terminal radical, and 40 to 5% by weight of solid polycyclo alkadiene.

20. The coating composition prepared according to the method of claim 1.

21. An adduct product formed from the reaction initiated by the addition of an ethylenically unsaturated polycarboxylic acid or its anhydride to a solution of a solid polycycloalkadiene polymer of ball and ring melting point of 70°–100°C and molecular weight of 700 to 800, in a liquid polyalkadiene conjugated polymer of 500–5000 molecular weight.

22. A paint binder comprising the adduct of claim 21 at least partially neutralized by a nitrogenous base.

23. A paint for application by electrodeposition comprising the paint binder of claim 22, and including pigments and deionized water.

* * * * *